US011453777B2

(12) United States Patent
Huang et al.

(10) Patent No.: US 11,453,777 B2
(45) Date of Patent: Sep. 27, 2022

(54) PRESSURE SENSITIVE ADHESIVES FROM PLANT OIL-BASED POLYOLS

(71) Applicant: Oregon State University, Corvallis, OR (US)

(72) Inventors: Jian Huang, Corvallis, OR (US); Anlong Li, Corvallis, OR (US); Kaichang Li, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 496 days.

(21) Appl. No.: 16/469,560

(22) PCT Filed: Dec. 14, 2017

(86) PCT No.: PCT/US2017/066496
§ 371 (c)(1),
(2) Date: Jun. 13, 2019

(87) PCT Pub. No.: WO2018/112248
PCT Pub. Date: Jun. 21, 2018

(65) Prior Publication Data
US 2020/0079957 A1 Mar. 12, 2020

Related U.S. Application Data

(60) Provisional application No. 62/435,594, filed on Dec. 16, 2016.

(51) Int. Cl.
| C08L 75/08 | (2006.01) |
| C09J 7/38 | (2018.01) |
| C08G 18/48 | (2006.01) |
| C08G 18/76 | (2006.01) |
| C08L 91/00 | (2006.01) |

(52) U.S. Cl.
CPC .......... C08L 75/08 (2013.01); C08G 18/4845 (2013.01); C08G 18/7621 (2013.01); C08L 91/00 (2013.01); C09J 7/38 (2018.01)

(58) Field of Classification Search
CPC ....... C08G 18/36; C09J 175/04; C09J 175/06; C09J 175/08; C09J 175/10; C09J 175/12; C09J 175/14; C09J 175/16; C09J 7/38; C09J 7/381; C08L 91/00; C08L 75/00; C08L 75/02; C08L 75/04; C08L 75/06; C08L 75/08; C08L 75/10; C08L 75/12; C08L 75/14; C08L 75/16; C09D 175/04; C09D 175/06; C09D 175/08; C09D 175/10; C09D 175/12; C09D 175/14; C09D 175/16
See application file for complete search history.

(56) References Cited

U.S. PATENT DOCUMENTS

| 2,882,249 | A |   | 4/1959  | Posnansky |
| 2,955,091 | A |   | 10/1960 | Kane |
| 3,246,049 | A |   | 4/1966  | Webber |
| 3,437,622 | A | * | 4/1969  | Dahl ..................... C09J 121/00 |
|           |   |   |         | 524/270 |
| 3,515,773 | A |   | 6/1970  | Dahl |
| 3,546,148 | A | * | 12/1970 | Diamond ............... C08G 18/10 |
|           |   |   |         | 528/74.5 |
| 3,930,102 | A |   | 12/1975 | Muller et al. |
| 4,025,477 | A |   | 5/1977  | Borden et al. |
| 4,508,853 | A |   | 4/1985  | Kluth et al. |
| 4,551,517 | A |   | 11/1985 | Herold et al. |
| 4,661,099 | A |   | 4/1987  | Von Bittera et al. |
| 4,742,087 | A |   | 5/1988  | Kluth et al. |
| 4,886,893 | A |   | 12/1989 | Meffert et al. |
| 5,157,101 | A |   | 10/1992 | Orr |
| 5,266,714 | A |   | 11/1993 | Stoll et al. |
| 5,302,626 | A |   | 4/1994  | Hoefer et al. |
| 5,591,820 | A |   | 1/1997  | Kydonieus et al. |
| 6,107,433 | A |   | 8/2000  | Petrovic et al. |
| 6,433,121 | B1 |  | 8/2002  | Petrovic et al. |
| 6,433,125 | B1 |  | 8/2002  | Gruetzmacher et al. |
| 6,518,359 | B1 |  | 2/2003  | Clemens et al. |
| 6,573,354 | B1 |  | 6/2003  | Petrovic et al. |
| 6,686,435 | B1 |  | 2/2004  | Petrovic et al. |
| 6,891,053 | B2 |  | 5/2005  | Chasar et al. |
| 7,989,647 | B2 |  | 8/2011  | Geiger et al. |
| 8,962,136 | B2 |  | 2/2015  | Takahira et al. |
| 2011/0111221 | A1 | | 5/2011 | Schumann |
| 2014/0037949 | A1 | | 2/2014 | Jo et al. |

FOREIGN PATENT DOCUMENTS

| JP | S57109877 | 7/1982 |
| JP | S57109878 | 7/1982 |
| JP | 58093774  | 6/1983 |

OTHER PUBLICATIONS

Sun, et al. "A novel direct synthesis of polyol from soybean oil", Chinese Chemical Letters, 23, 19-922, Jul. 4, 2012. (Year: 2012).*
International Search Report and Written Opinion issued for International Application No. PCT/US2017/066496 dated Apr. 13, 2018.
Gite et al., "Synthesis and characterization of polyurethane coatings based on trimer of isophorone diisocyanate (IPDI) and monoglycerides of oils," *Surface Coatings International Part B: Coatings Transactions*, 89(2): 117-122, Jun. 2006.
Kong et al., "Characterization of canola oil based polyurethane wood adhesives," *International Journal of Adhesion and Adhesives*, 31(6): 559-564, Sep. 2011.
Kong et al., "Preparation and characterization of high-solid polyurethane coating systems based on vegetable oil derived polyols," *Progress in Organic Coatings*, 76(9): 1151-1160, Sep. 2013.

(Continued)

*Primary Examiner* — Christopher M Rodd
(74) *Attorney, Agent, or Firm* — Klarquist Sparkman, LLP

(57) ABSTRACT

A polymer made by:
(A) initially reacting poly(propylene glycol) with tolylene diisocyanate to form an intermediate product, and
(B) subsequently reacting the resulting intermediate product with at least one polyol, wherein the polyol was derived from, or is, a plant oil.

21 Claims, 1 Drawing Sheet

(56) References Cited

OTHER PUBLICATIONS

Maminski et al., "Hyperbranched polyglycerols with bisphenol A core as glycerol-derived components of polyurethane wood adhesive," *BioResources*, 7(2): 1440-1451, 2012.

Mishra et al., "Eco-economical polyurethane wood adhesives from cellulosic waste: Synthesis, characterization and adhesion study," *International Journal of Adhesion and Adhesives*, 30(1): 47-54, Jan. 2010.

Silva et al., "A solventless castor oil-based PU adhesive for wood and foam substrates," *International Journal of Adhesion and Adhesives*, 30(7): 559-565, Oct. 2010.

\* cited by examiner

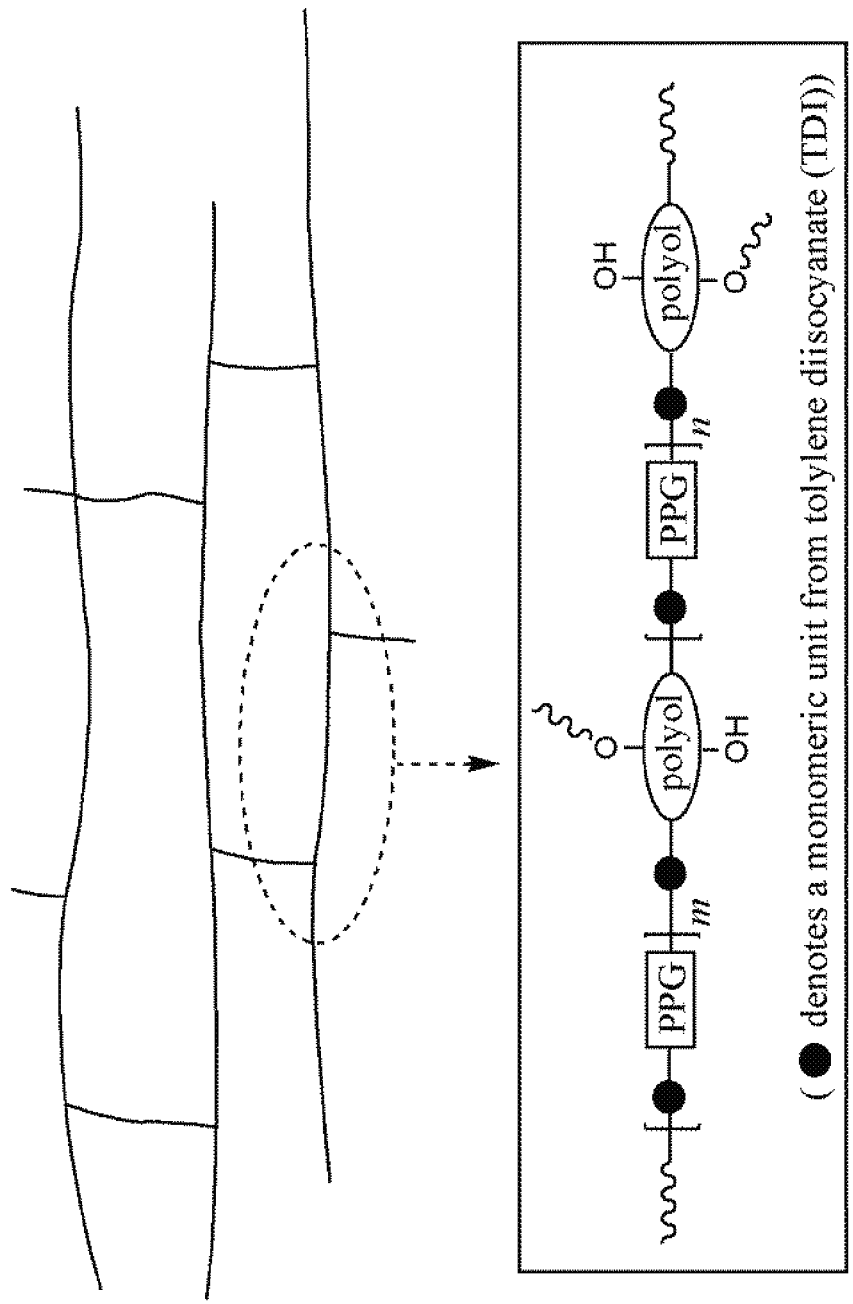

PRESSURE SENSITIVE ADHESIVES FROM PLANT OIL-BASED POLYOLS

This is the U.S. National Stage of International Application No. PCT/US2017/066496, filed Dec. 14, 2017, which was published in English under PCT Article 21(2), which in turn application claims the benefit of U.S. Provisional Appl. No. 62/435,594, filed Dec. 16, 2017, which is incorporated herein by reference in its entirety.

BACKGROUND

Polymerization of an isocyanate containing no less than two isocyanate groups (NCO) and a diols/polyol containing no less than two hydroxyl groups (OH) gives a polyurethane. Whether a polyurethane can serve as a pressure sensitive adhesive (PSA) or not is dependent upon specific combinations of particular isocyanates and particular polyols. In other words, not all polyurethanes are suitable for PSA applications. The chemical structures and the amounts of OH or NCO functionality of the starting isocyanates and polyols, and the OH/NCO ratios in the mixtures of isocyanates/polyols all play important roles in PSA properties (if any) of the resulting polyurethanes such as adhesive strength, cohesive strength, tack and aging resistance. Unfortunately, whether a polyurethane can have PSA properties still cannot be predicted from the chemical structures of starting isocyanates and polyols.

The diols and polyols in previously described preparations of the polyurethane-based PSAs are derived from non-renewable petrochemicals. Exemplary diols and polyols used in the art for the PSAs include OH-terminated polyethers such as poly(propylene glycol)s (PPG), poly(ethylene glycol)s and polytetrahydrofuran, polyester-based polyols, and hydroxylated elastomers such as OH-terminated styrene-butadiene copolymers, OH-terminated polybutadiene, OH-terminated acrylonitrile-butadiene copolymers. Plant oils that contain carbon-carbon double bonds such as soybean oil, corn oil, rapeseed oil, sunflower oil, peanut oil, safflower oil, olive oil and cotton seed oil, can be functionalized with OH groups to give polyols. Soybean oil is one of the most abundantly available and least inexpensive plant oils, and contains an average of 4.6 carbon-carbon double bonds per triglyceride molecule. Most of the commercially available polyols are made from soybean oil. Some plant oils even naturally contain OH groups. For example, castor oil contains an average of 2.7 OH groups per triglyceride molecule.

Polyurethanes from reactions of isocyanates and plant oil-based polyols are typically used for coatings and adhesives, but do not have any PSA properties. For use as coatings or wood adhesives, the polyurethanes from plant oil-based polyols must have their glass transition temperature ($T_g$) higher than a use temperature, typically ranging from about room temperature to about 150° C. Polyurethane-based coatings or wood adhesives from plant oils are typically strong and rigid, and are required not to deform and flow under a load at their use temperatures. On the contrary, the $T_g$ of a PSA must be lower than its use temperature so that the PSA can easily deform and flow onto adherends under a light pressure for good adhesion. Publications and invention disclosures on applications of polyurethanes from isocyanates and plant oil-based polyols as coatings and wood adhesives would discourage one to use these polyurethanes for PSA applications because the coatings/wood adhesives and PSAs have the opposite requirement for their $T_g$. No polyurethanes from reactions of plant oil-based polyols and isocyanates have been reported to serve as PSAs so far.

Polyester polyols that are prepared from polymerization of renewable castor oil and diglycolic acid that can be used for preparations of polyurethane-based PSAs are disclosed in U.S. Pat. No. 3,246,049. However, U.S. Pat. No. 3,246,049 reveals that the resulting polyurethane is semi-liquid, has very low cohesive strength, and thus cannot serve as a PSA when the polyester polyols are replaced by pure castor oil. We have independently verified that polyurethanes from reactions of castor oil and tolylene diisocyanate (TDI), alone, under various TDI/castor oil weight ratios and various reaction conditions do not have desirable PSA properties. We surprisingly discovered that polyurethanes from reactions of castor oil, certain poly(propylene glycol)s (PPGs) and TDI under particular reaction conditions have superior PSA properties.

SUMMARY

Disclosed herein in one embodiment is a polymer made by:

(A) initially reacting poly(propylene glycol) with tolylene diisocyanate to form an intermediate product, and (B) subsequently reacting the resulting intermediate product with at least one polyol, wherein the polyol was derived from, or is, a plant oil.

A polyurethane comprising a poly(propylene glycol) repeating unit, a tolylene diisocyanate repeating unit, and a polyol repeating unit, wherein the polyol was derived from a plant oil.

Disclosed herein in another embodiment is a polyurethane having a structure represented by:

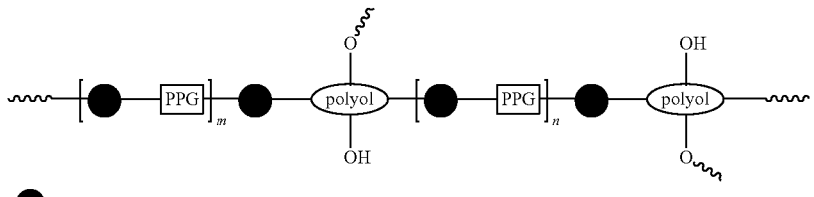

wherein PPG denotes a monomeric unit from poly(propylene glycol); the polyol was derived from a plant oil; m is 1 to 100; and n is 1 to 100.

Further disclosed herein are pressure sensitive adhesive constructs comprising:

(A) a backing substrate; and (B) a pressure sensitive adhesive disposed on the backing substrate, wherein the pressure sensitive adhesive comprises the polymer or polyurethane disclosed herein.

Additionally disclosed herein is a method for making a pressure sensitive adhesive comprising:

(A) initially reacting poly(propylene glycol) with tolylene diisocyanate to form an intermediate product, and (B) subsequently reacting the resulting intermediate product with at least one polyol, wherein the polyol was derived from, or is, a plant oil.

Also disclosed herein is a method for making a pressure sensitive adhesive comprising reacting tolylene 2,4-diisocyanate terminated poly(propylene glycol) with at least one polyol, wherein the polyol was derived from, or is, a plant oil.

Further disclosed herein is a method comprising reacting together:

(A) a vegetable oil;
(B) hydrogen peroxide; and
(C) a carboxylic acid
resulting in converting the soybean oil into a polyol.
Additionally disclosed herein is a method comprising:
reacting vegetable oil with at least one anhydride resulting in an anhydride-functionalized oil that includes anhydride-functionalized triglyceride moieties; and reacting the anhydride-functionalized oil with at least one organic amine that includes at least one primary amine groups and at least one hydroxyl group,
resulting in a modified soybean oil that includes at least two hydroxyl groups per triglyceride moiety.

Further disclosed herein is a method comprising:
reacting epoxidized vegetable oil with phenol, a substituted phenol, or a mixture thereof in the presence of a phase-transfer catalyst resulting in converting the soybean oil into a polyol.

BRIEF DESCRIPTION OF THE DRAWING

FIG. 1 is a representative structure of a novel polyurethane disclosed herein.

DETAILED DESCRIPTION

Pressure-sensitive adhesive (PSA, also known as "self-adhesive" or "self-stick adhesive") is a distinct category of adhesives which in dry form (solvent/water free) are aggressively and permanently tacky at room temperature. PSAs form a bond at room temperature with a variety of dissimilar surfaces when light pressure is applied. No solvent, heat or radiation is needed to activate the adhesive. They find wide applications in pressure-sensitive tapes, general purpose labels, post-it notes, postage stamps, and a wide variety of other products, e.g., packaging, automobile trim assembly, sound/vibration damping films, maternity and child care products such as diapers, and hospital and first aid products such as wound care dressings.

Disclosed herein are PSAs made from plant oil-based polyols, PPGs, and isocyanates, and a simple, solvent-free process for making the PSAs. Also disclosed herein are new types of plant oil-based polyols suitable for making PSAs, and a new, one-step, and cost-effective method for making the polyols directly from plant oils.

Castor oil and other polyols derived from renewable plant oils may be used for making the polyurethane-based PSAs. Plant oils that contain carbon-carbon double bonds such as soybean oil, corn oil, rapeseed oil, sunflower oil, peanut oil, safflower oil, olive oil and cotton seed oil, can be functionalized with OH groups to give polyols. Some plant oils even naturally contain OH groups. For example, castor oil contains an average of 2.7 OH groups per triglyceride molecule. In some embodiments disclosed herein, castor oil is used as a renewable polyol for the PSAs. In other embodiments, plant oil-based polyols derived from soybean oil are used. In certain embodiments, the only polyol(s) used is castor oil or a polyol derived from a plant oil. In certain embodiments, the castor oil is not modified prior to its use for making the PSAs. For example, substantially pure (≥98% purity) castor oil is reacted with the poly(propylene glycol)/tolylene diisocyanate adduct.

Soybean oil is one of the most abundantly available and least inexpensive plant oils. On average, soybean oil contains 4.6 carbon-carbon double bonds per triglyceride molecule. Most of the commercially available polyols are made from soybean oil. There are several methods of introducing OH groups into the triglyceride molecules of soybean oil. Among others, a two-step process beginning with the epoxidation of soybean oil is best known in the art. In this process, the carbon-carbon double bonds of soybean oil are first epoxidized to give epoxidized soybean oil (ESO); ring opening of the epoxy groups of ESO forms polyols, which may be accomplished in a variety of ways. For example, U.S. Pat. Nos. 2,882,249 and 4,025,477 disclose polyols formed by ring opening the epoxy groups of ESO with ricinoleic acid and acrylic acid, respectively. U.S. Pat. Nos. 5,266,714 and 5,302,626 also discloses polyols obtained by opening the epoxy groups of ESO with carboxylic acids. U.S. Pat. Nos. 4,508,853 and 4,742,087 disclose polyols obtained by opening the epoxy groups of ESO with alcohols. U.S. Pat. Nos. 6,433,125 and 4,551,517 also disclose polyols obtained by opening the epoxy groups of ESO with alcohols including higher alcohols. U.S. Pat. No. 4,886,893 discloses polyols obtained by opening the epoxy groups of ESO with polyfunctional alcohols. U.S. Pat. No. 6,891,053 discloses polyols obtained by opening the epoxy groups of ESO with acid-leached clay. U.S. Pat. Nos. 6,107,433, 6,433,121, 6,573,354 and 6,686,435 disclose polyols obtained by opening the epoxy groups of ESO with a mixture of water, alcohol and fluoroboric acid.

In one embodiment disclosed herein, the polyol may be obtained by opening the epoxy groups of ESO with water in the presence of an acid such as perchloric acid, hydrochloric acid, hydrobromic acid or phosphoric acid; this polyol is referred to herein as "Polyol-1." Polyol-1 had a hydroxyl value of 250 mg KOH/g. It has OH groups on the fatty acid chains of the triglycerides as illustrated below (wherein at least one R (more particularly a plurality of R moieties) is H and at least one R (more particularly a plurality of R moieties) is a fatty acid moiety derived from a triglyceride molecule). More specifically, in addition to the diol structures (as illustrated below, wherein R=H) formed from hydrolysis of the epoxy groups of ESO, Polyol-1 also includes linkages formed from polymerization of ESO; the resulting polymers have typical structures as illustrated below, wherein R represents fatty acid moieties of the triglyceride molecules.

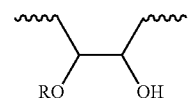

In another embodiment, the polyol may be obtained by opening the epoxy groups of ESO with methanol in the presence of tetrafluoroboric acid; this polyol was referred to herein as "Polyol-2." Polyol-2 has OH groups on the fatty acid chains of the triglycerides as illustrated below (wherein, at least one R (more particularly a plurality of R moieties) is H, at least one R (more particularly a plurality of R moieties) is methyl, and at least one R (more particularly a plurality of R moieties) is a fatty acid moiety derived from a triglyceride molecule).

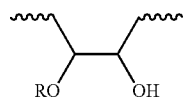

A difference between Polyol 1 and Polyol 2 is that Polyol 2 includes methoxy groups (i.e., R is methyl) but Polyol 1 does not include methoxy groups.

As described previously, the conventional two-step process that begins with the epoxidation of soybean oil is complex and thus increases the cost of producing the soybean oil-base polyols. In some embodiments disclosed herein, a novel and simple method of direct conversion of plant oils into polyols is employed, which could considerably reduce the production cost of the plant oil-based polyols. The starting plant oils that can be used in this new process include but not limited to soybean oil, rapeseed oil, canola oil, sunflower oil, corn oil, peanut oil, safflower oil, olive oil and cotton seed oil. An examples that uses soybean oil as the starting material for preparing polyols is described as follows: a mixture of soybean oil, hydrogen peroxide and a carboxylic acid is heated at a temperature of from 60° C. to 160° C., preferably from 80° C. to 120° C., in the presence of a strong acid and 1,4-dioxane to yield a polyol with a predetermined hydroxyl value. The hydrogen peroxide is used to epoxidize the double bond of the plant oil. The carboxylic acid is used for opening the epoxy groups formed from the epoxidation reaction, which results in a carboxylate with a hydroxyl group at the beta position. Carboxylic acids that can be used herein include but are not limited to formic acid, acetic acid, propionic acid and butyric acid.

Soybean oil is not miscible with the aqueous solution of hydrogen peroxide. Therefore, solvents that dissolve soybean oil and at the same time are miscible with the aqueous solution are used in the process. Such solvents include but not limited to 1,4-dioxane and tetrahydrofuran. With the aid of such solvents, the epoxidizing reagents in the aqueous solution have more chance of getting access to the double bonds of soybean oil; the epoxidation reaction thus takes place more effectively and efficiently as compared to the system without using such solvents. The strong acids used herein are typically acids that completely dissociates in a solution and have a logarithmic acid dissociation constant of lower than −3.0. Such strong acids include but not limited to sulfuric acid, perchloric acid, hydrochloric acid, nitric acid, and sulfonic acid. Commercially available Amberlite® IR 120 is a polystyrene sulfonate exchange resin in hydrogen form; it is preferably used in the present invention, because the acid is in solid form and can be easily separated by filtration after the reaction and reused. After the filtration, the filtrate is distilled to give the polyol, and the distillate containing 1,4-dioxane, acetic acid and water could also be reused. Compared with the two-step process described previously that begins with the epoxidation of soybean oil, this method utilized a simple one-step process which was much easier and more efficient, and resulted in lower production cost of the polyols. The hydroxyl value of the polyols could be controlled by varying the weight ratio of hydrogen peroxide in the reaction mixture. In preferred embodiments, the polyols may be produced to have hydroxyl values of from 150 mg KOH/g to 260 mg KOH/g. In more preferred embodiments, a polyol with a hydroxyl value of 230 mg KOH/g may be prepared and used; this polyol is referred to herein as "Polyol-3". The polyol produced with the new one-step process has a viscosity of from 50,000 cps to 90,000 cps at 20° C., which is lower than that of the polyol obtained from opening the epoxy groups of ESO with water in the presence of perchloric acid; the latter polyol typically has a viscosity of from 300,000 cps to 400,000 cps at 20° C.

In another embodiment, the polyol is a further new type of polyol derived from plant oils such as soybean oil, rapeseed oil, canola oil, sunflower oil, corn oil, peanut oil, safflower oil, olive oil, cotton seed oil, or a mixture thereof. An example that uses soybean oil as the starting material for the preparation of the polyol is described as follows. Soybean oil is treated with iodine at a temperature of from 150° C. to 250° C. for the isomerization of the nonconjugated linoleic acid moieties in soybean oil into conjugated linoleic acid moieties. Iodine is used as a catalyst for the isomerization; other catalysts for this type of reaction have been well documented in the literature (e.g., Bernas, A.; Kumar, N.; Maki-Arvela, P.; Laine, E.; Holmbom, B.; Salmi, T.; Murzin, D. Yu. Conjugation of Linoleic Acid over a Hydrogen Preactivated Heterogeneous Catalyst. *Chem. Commun.* 2002, 10, 1142-1143; Reaney, M. J. T.; Liu, Y. D.; Westcott, N. D. Commercial Production of the selective isomerization of technical grade (~55%) linoleic Conjugated Linoleic Acids, *Agriculture and Agri-Food Canada*: Saskatoon, SK, Canada, 1999). The isomerized soybean oil is then reacted with maleic anhydride (MA) to give a MA-modified oil that is composed of anhydride-functionalized triglycerides. MA is preferably used, however, other similar anhydrides such as itaconic anhydride can also be used. The MA-modified oil is then reacted with alkanolamines such as ethanolamine that contain primary amine groups and OH groups, to give a modified soybean oil that has at least two OH groups per triglyceride moiety. Ethanolamine is preferably used, however, other alkanolamines such as propanolamine and valinol can also be used instead. In preferred embodiments, polyols may be produced from soybean oil with this method and have a hydroxyl value of from 100 mg KOH/g to 170 mg KOH/g. In more preferred embodiments, a polyol with a hydroxyl value of 110 mg KOH/g may be used; this polyol is referred to herein as "Polyol-4". Polyol-4 has typical OH groups attached to the fatty acid chains of the triglycerides as illustrated below.

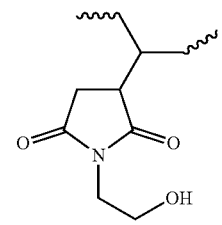

According to a further embodiment, new polyols may be prepared by neat reaction of ESO and phenol or substituted phenols in the presence of a phase-transfer catalyst. The reaction is carried out at a temperature of from 120° C. to 170° C., preferably from 130° C. to 160° C. Illustrative catalysts suitable for this reaction could be trialkyl benzyl ammonium halide or tetraalkylammonium halide such as tetramethyl ammonium chloride, tetraethylammonium chloride, tetrapropylammonium chloride, tetrabutylammonium chloride, tetramethylammonium bromide, tetramethylammonium iodide or trimethylbenzyl ammonium chloride. The para-, meta- or ortho-substituted phenol or a mixture of them can be employed in the reaction, but para-substituted phenols were preferred due to the less steric hindrance of the OH groups. Illustrative substituted phenols include p-hydroxybenzyladehyde, vanillin, methyl 4-hydroxybenzoate, p-hydroxybenzonitrile, p-hydroxyacetophenone, p-fluorophenol, p-bromophenol or p-chlorophenol. For example, the reaction time for the system of vanillin and ESO was much longer than that of p-hydroxybenzyl aldehyde and ESO. The polyols from the reaction of ESO and phenol or substituted phenols have typical OH groups attached to the fatty acid chains of the triglycerides as illustrated below (wherein each $R^1$ is independently —H, —CHO, halogen, —CN, —$NO_2$, —$COOR^2$ or $COR^2$, wherein $R^2$ is an alkyl, particularly $C_1$-$C_6$ alkyl).

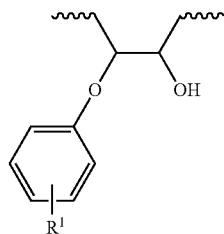

In preferred embodiments, the plant oil-based polyols have a hydroxyl functionality of 2 to 6. The hydroxyl functionality of the polyols, as well as the NCO/OH molar ratio of the reaction mixture, determines the density of crosslinks of the resulting polyurethanes that plays a critical part in the balance between the adhesive strength and cohesive strength of the polyurethane-based PSAs. With the NCO/OH molar ratio of the reaction mixture being constant, polyols with a higher hydroxyl functionality would result in a greater density of crosslinks and thus a reduction in the conformability and plastic flow of the resulting PSAs. Such PSAs would be less tacky and have lower peel strength.

In general, the reactions of plant oil-based polyols with isocyanates without a further additive or modification do not result in polyurethanes having PSA properties. For example, polyurethanes made by reacting castor oil with TDI are not suitable as PSAs. We discovered that incorporation of a PPG into the above polyurethane formulations could result in PSAs. In certain embodiments, the only reactive starting materials for making the PSA are TDI, PPG and the plant oil-based polyol.

We further discovered that in certain embodiments the PPGs should have number-average molecular weights ranging from 300 to 4000, preferably from 400 to 2000, otherwise the resulting materials did not have desirable PSA properties. Commercially available PPGs such as PPG with a number-average molecular weight of 400 (PPG400), 425 (PPG425), 1000 (PPG1000), 2000 (PPG2000) and 4000 (PPG4000) could be used. In preferred embodiments, the PPG used was PPG2000.

In certain embodiments, the resulting polyurethane from PPG, TDI and a plant oil-based polyol exhibited limited tackiness and had low peel strength if PPG, the plant oil-based polyol, and TDI were simultaneously mixed together. TDI used herein can be tolylene-2,4-diisocyanate, tolylene-2,6-diisocyanate or a mixture of tolylene-2,4-diisocyanate and tolylene-2,6-diisocyanate. It was unexpected that the resulting polyurethanes had high peel strength and good aging resistance if the formulations were cured in the following manner: (a) PPG is initially reacted with TDI, preferably at a NCO/OH molar ratio of two under a carefully controlled conditions until the OH groups were consumed, resulting in an intermediate product; (b) subsequently the intermediate product is reacted with the plant oil-based polyol.

Two other commonly available isocyanates, 4,4'-methylenediphenyl diisocyanate (MDI) and polymeric MDI (pMDI) were investigated as a replacement for TDI under the same NCO/OH molar ratios. The reaction of the PPG with MDI resulted in a solid product that could not be further mixed with plant oil-based polyols for the preparation of polyurethanes. Reaction of the PPG with pMDI resulted in a gel that also could not be further mixed with the polyols. It was unexpected that reaction of PPG with TDI could result in a liquid that can be well mixed with the plant oil-based polyols for the preparation of polyurethanes. We also discovered that the resulting polyurethanes had high peel strength and good aging resistance if PPG reacts with TDI at a temperature of below 80° C., preferably below 50° C., followed by the reaction with the plant oil-based polyols. The resulting polyurethanes had very low peel strength if the PPG reacted with TDI at 100° C. or above.

Although not bound by any theory, below is a possible explanation on why TDI works better than MDI and pMDI, and the reaction between the PPG and TDI should carried out at a low temperature. TDI has two NCO groups that have different reactivities. The ortho-NCO group is sterically hindered by its neighboring methyl group, thus being less reactive than the para-NCO group. The more reactive para-NCO group of TDI preferentially reacts with OH groups of PPG to form a TDI-PPG-TDI adduct that is terminated with the less reactive ortho-NCO groups when the reaction of PPG with TDI is carried out at a temperature of below 50° C. and a NCO/OH molar ratio of two. The reactivity difference between the ortho-NCO group and the para-NCO group of TDI diminishes and the reaction of PPG and TDI leads to formation of polymers instead of the adduct when the reaction is carried out at a higher temperature such as 100° C. There are no differences in reactivity among the NCO groups in MDI and pMDI. The reactions between the PPG and MDI or pMDI tend to form solid or gel polymers instead of a liquid adduct.

A representative structure of the polyurethanes in this disclosure is shown in FIG. 1. The polyurethane from a TDI-PPG-TDI adduct and a plant oil-based polyol has an alternating structure of two repeating blocks: TDI-PPG-TDI and polyol units (m=n=1 in FIG. 1). Polyol units containing unreacted OH groups are distributed along the polymer chains. The TDI-PPG-TDI adduct and residual TDI would react with the unreacted OH groups of the polyol units, and may form a crosslinked network. When PPG, TDI and the plant oil-based polyols are simultaneously reacted, the resulting polyurethane would not have the alternating structure, i.e., the polyurethane has a very random structure. Increase in the temperature from 50° C. to 100° C. for the reaction between the PPG and TDI tends to increase the m and n in FIG. 1 (wherein m and n can range from 1 to 100, independently). In certain embodiments, m and n have to be small, particularly less than or equal to 5, most particularly less than or equal to 3, and preferably be equal to one for the resulting polyurethane to have superior PSA properties.

In a preferred embodiment, the formulations may be coated onto a backing material at a coating rate of about 1.0 to 8.0 mg/cm². The coating layer on the backing material may be heated in an oven chamber such as an air circulating oven or through a tunnel equipped with infrared light at a temperature of from 60° C. to 200° C., for a time of less than 90 s, preferably less than 30 s. The coating layer may be laminated to the release agent-treated face of a release liner such as a siliconized poly(ethylene terephthalate) (PET) film or siliconized paper to give a backing/adhesive/liner laminate, or wound to the other side of the backing itself that was pretreated with release agent to give a roll. The laminate or roll may then be allowed to age at room temperature for at least 3 h, preferably at least 8 h. Reactions may further occur at room temperature until they were complete as evidenced by the disappearance of NCO groups in the FTIR spectrum of the adhesive layer.

We discovered that the reaction temperature for the polymerization of the TDI-PPG-TDI adduct and the plant oil-based polyols was a factor affecting the PSA properties of the resulting polyurethanes. If the formulations were completely cured in one stage at an elevated temperature, the resulting polyurethanes had low peel strength. If the formulations were cured at room temperature only, the resulting polyurethanes had high peel strength, but were not aging-resistant in an environment with high humidity and partially disintegrated after aging. It was unexpected that the resulting polyurethanes had high peel strength and good aging resistance if the formulations are cured in the following manner: the formulations were initially heated at elevated temperatures until the conversion of the NCO groups reached a degree ranging from 30% to 95%, preferably from 60% to 95%, and were then subsequently cured at room temperature after they were laminated to a release liner.

From starting materials that include PPG(s), TDI and plant oil-based polyol(s) and the same NCO/OH molar weight ratio, PSAs can be made with different peel strength by varying the reaction conditions and the sequence of the reactions among the starting materials. In addition, we discovered that the properties of the PSAs from the polyurethanes can also be changed by varying the NCO/OH molar ratio of the formulations. The NCO/OH molar ratio affects the density of crosslinks of the resulting polyurethanes, thus affecting the balance between the cohesive strength and adhesive strength of the polyurethane-based PSAs. In the cases that the NCO/OH ratio is above 1.0, there will be excess amount of NCO groups remaining unreacted after all of the OH groups are consumed. Remaining NCO groups may react with each other to form allophanate linkages, or react with the water in the air to form $-NH_2$ groups which in turn will react with other NCO groups to form carbamide linkages. The resulting $-NH_2$ groups and new linkages affects the PSA properties of the polyurethanes. In the cases with a NCO/OH ratio of less than 1.0, the final PSAs will have excess OH groups after all the NCO groups are consumed. Free OH groups afford sufficient points of "quickstick" or "grab" to the PSAs. The OH groups can improve the wetting of the PSAs on various adherends such as stainless steel, paper, glass, and skin, thus facilitating the intimate contact between the PSAs and the adherends. They also significantly improve the adhesive strength of the PSAs through formations of hydrogen bonds between the PSAs and adherends. In addition, the remaining OH groups increase the number of points available for forming hydrogen bonds among molecular chains and within the same molecular chains of the PSA, thus increasing the cohesive strength of the PSA. Therefore, for achieving a balance between the cohesive and adhesive strength of the polyurethane-based PSAs, the NCO/OH ratio may be from 0.2 to 1.5, preferably from 0.5 to 0.9. In calculating the NCO/OH molar ratio, the OH groups present on both the starting PPGs and the plant oil-based polyols are considered.

In certain embodiments, the curing time for making the PSAs at elevated temperatures could be shortened to a time of less than 90 s, and preferably less than 30 s. Short curing time at elevated temperatures not only saves energy, but also is desirable for efficient industrial manufacturing of PSAs.

A suitable catalyst could be optionally added to the formulations for accelerating the reaction between NCO and OH groups, and thus speeding up the polymerization and curing. Suitable catalysts could be organometallic compounds such as dibutyltin dilaurate, dioctyltin diacetate, dihexyltin diacetate, dihexyltin dipropionate, dihexyltin dicaproate, dihexyltin diethylhexoate, dioctyltin monolaurate, dihexyltin monoethylhexoate, dihexyltin monolaurate, tin octoate, tin naphthenate, lead naphthenate and iron (III) acetylacetonate, or tertiary amines. The catalyst could be added in the first step (i.e., the preparation of TDI-PPG-TDI adduct), or in the second step (i.e., the polymerization of the TDI-PPG-TDI adduct with the polyols), or in both steps. The concentration of the catalyst was generally from 0.1-3.0%, preferably 0.2-1.0% by weight based on the total weight of the formulations. Generally, an increase in the amount of catalysts increases the rate of polymerization and curing. However, this also shortens the pot life of the reaction mixtures (the pot life is defined as the time between finishing the preparation of the mixtures and the time when the mixtures become an unspreadable gel).

Tackifier and plasticizer that are commonly used in the art could be optionally added to the PSAs. The usual antioxidants and/or fillers could also be used in the PSAs as long as they are inert to the reactants and products.

The backing materials for the PSAs could be paper, cellophane, cloth, metal foils, and plastic film such as PET film, bi-axially oriented polypropylene (BOPP) film and polyvinylchloride film.

Example 1 (Preparation of Polyol-1)

Epoxidized soybean oil (ESO) (100 g) was dissolved in tetrahydrofuran (50 mL). Into the resulting solution, a mixture of perchloric acid solution (60 wt % in water) (2.5 g) and deionized water (25 g) was added dropwise in 5 min. A milky mixture was formed after the addition of acid solution. The reaction was exothermic; during the first hour of the reaction, the temperature of the reaction mixture went up to around 60° C. and then fell back to room temperature. The reaction mixture was stirred for another 4.5 h. Ethyl acetate (200 mL) and saturated sodium bicarbonate solution (100 mL) were then added and mixed well with the reaction mixture. The resulting mixture was transferred into a 1000 mL separatory funnel and allowed to separate into layers. After draining the aqueous layer, the organic layer was washed with brine (100 mL×6), and dried over anhydrous sodium sulfate. Removal of the organic solvent under vacuum yielded transparent, light yellow oil (97 g). The oil was characterized with FTIR and $^1$H-NMR. In the FTIR spectrum of the product, a significant absorbance for the hydroxyl group appeared at 3412 cm$^{-1}$ and the peaks for the epoxy rings at 820-840 cm$^{-1}$ disappeared. In the $^1$H-NMR spectrum of the product, there were no peaks at 2.8-3.2 ppm, which indicates that no residual epoxy rings were present in the product. The hydroxyl value of the product was 249 mg KOH/g. The hydroxyl value of the product was determined in accordance with ASTM D 4274-99 (Test Method A-Acetylation).

Example 2 (Preparation of Polyol-2)

Into a solution of ESO (40 g) in methanol (56.8 g), a tetrafluoroboric acid solution (48% in water) (0.2 g) was added. The mixture was well stirred. The temperature of the reaction mixture increased during the first 40 min to about 65° C. and then was maintained at this temperature while stirring for 2.5 h. The mixture was extracted with ethyl acetate (70 mL). The organic layer was washed with brine (35 mL×6), and dried over anhydrous sodium sulfate. Evaporation under vacuum yielded transparent and light yellow oil (28.3 g). The oil was characterized with FTIR and $^1$H-NMR. In the FTIR spectrum of the product, a significant absorbance for the hydroxyl group appeared at 3457 cm$^{-1}$. In the $^1$H NMR spectrum of the product, peaks at 2.8-3.2 ppm were still observed, which indicated that some residual epoxy rings were still present in the product. The hydroxyl value of the product was 180 mg KOH/g.

Example 3 (Preparation of Polyol-3)

Soybean oil (60.3 g), acetic acid (36.1 g), 1,4-dioxane (31.0 g) and Amberlite IR 120 (hydrogen form) (15.5 g) were placed in a flask equipped with a magnetic stirrer, condenser, and silicone oil bath. The mixture was stirred at 800 rpm at room temperature. A hydrogen peroxide solution (30 wt % in water) (43.4 g) was then added dropwise over a period of 5 min. Afterwards, the resulting mixture was heated at 100° C. with stirring for about 6 h. The mixture was then filtered to remove the Amberlite (it can be reused). The filtrate was distilled to give clear light yellow oil (60.0 g). The distillate contained 1,4-dioxane, acetic acid and water, and could also be reused as parts of the reagents and solvents. The oily product was characterized with FTIR. In the FTIR spectrum of the product, a new band at 3500 $cm^{-1}$ due to hydroxyl groups appeared, the peaks of the double bond at 3010 $cm^{-1}$ disappeared, and there were no peaks of epoxy groups at 820-850 $cm^{-1}$. The hydroxyl value of the product was 235 mg KOH/g.

Example 4 (Preparation of Polyol-4)

Soybean oil (50.0 g) and iodine (0.11 g) were placed in a round-bottom flask. The resulting mixture was bubbled with nitrogen gas for 5 min while stirring at room temperature. The flask was then sealed tightly and placed in a silicone oil bath. The reaction mixture was heated at 220° C. while stirring for 1 h, and subsequently cooled to about 100° C. Into the mixture was added maleic anhydride (5.0 g). The resulting reaction mixture was heated at 100° C. while stirring for 1.5 h. Another portion of maleic anhydride (9.5 g) was then added into the reaction mixture. The resulting mixture was heated at 220° C. with stirring for 2 h. Afterwards, vacuum was carefully applied to the flask to remove the remaining maleic anhydride. The product (63.0 g) was clear, light brown-yellow, viscous oil. Into the oil, p-xylene (24.3 g) and 1-butanol (8.6 g) were added. The mixture was refluxed for 40 min, followed by addition of ethanolamine (8.8 g). The resulting mixture was heated at 125° C. for 80 min. Afterwards, the mixture was subjected to rotary evaporation to remove the solvents, and then high vacuum was applied to it to remove the residue ethanolamine. The product (70 g) was light brown-yellow and viscous. In the FTIR spectrum of the product, a new band at 3450 $cm^{-1}$ due to hydroxyl groups and a new peak at 1695 $cm^{-1}$ due to the imide groups appeared, and the peaks of the cyclic anhydride groups at 1860 and 1780 $cm^{-1}$ disappeared. The hydroxyl value of the product was 110 mg KOH/g.

Example 5 (Preparation of Polyol-5)

Phenol (9.84 g) was added into soybean oil (20 g) and the mixture was heated to 60° C. under nitrogen. After phenol was dissolved in soybean oil, a tetrafluoroboric acid solution (50-55 wt % in ether) (0.4 g) was added. The resulting mixture was heated at 90° C. while stirring for 6 h. A red brown viscous product was obtained. The product was mixed well with ethyl ether (30 mL) and the mixture was washed with brine (20 mL×10), dried over anhydrous sodium sulfate, and evaporated under vacuum. A dark brown, viscous oil (25.8 g) was obtained. According to $^{1}$H-NMR, about 85% of the double bonds in soybean oil was converted. In the FTIR spectrum of the product, a significant absorbance for hydroxyl groups appeared at 3412 $cm^{-1}$. The hydroxyl value of the product was 150 mg KOH/g.

Example 6 (Preparation of Polyol-6)

Epoxidized soybean oil (20 g), 4-hydroxybenzaldehyde (11 g) and triethylbenzyl ammonium chloride (0.2 g) were placed in a 100 mL one-neck flask. The mixture was heated in an oil bath until 4-hydroxybenzaldehyde was completely melted. The mixture was flushed with $N_2$ gas for one min, and then heated at 150° C. for 8 h. The product was yellow, brown and highly viscous. In the FTIR spectrum of the product, the OH absorption of the 4-hydroxybenzaldehyde at 3292 $cm^{-1}$ disappeared, a new band at 3410 $cm^{-1}$ appeared which was due to the OH groups from the opening of the epoxy rings, a new peak at 1254 $cm^{-1}$ due to the C—O—C linkage resulted from the reaction of ESO and the 4-hydroxybenzaldehyde was also observed.

Example 7 (Preparation of PPG-TDI1)

PPG2000 (50 g), tolylene diisocyanate (8.88 g, technical grade, containing 80 wt % of tolylene-2,4-diisocyanate and 20 wt % of tolylene-2,6-diisocyanate) and dibutyltin dilaurate (DBTDL) (0.5 g) were placed in a 250 mL three-necked round bottom flask. After being flushed with $N_2$ gas for 5 min, the mixture was stirred at room temperature. The reaction process was monitored with FTIR. After 4.5 h, the peak of the hydroxyl groups of PPG2000 disappeared in the FTIR spectrum of the product, and the intensity of the NCO group did not decrease further, which indicates that the reactions were complete. The stirring was then stopped. The product was stored at room temperature under dry $N_2$ gas.

Example 8 (Preparation of PPG-TDI2)

The same reaction conditions as used in Example 7 were employed except that the reaction temperature was 100° C. After 1 h, the peak of the OH groups of PPG2000 disappeared in the FTIR spectrum of the product, and the intensity of the NCO group did not decrease further, which indicates that the reactions were complete. The product was stored at room temperature under dry $N_2$ gas.

Example 9 (Preparation of PPG-TDI3)

The same reaction conditions as used in Example 7 were employed except that the stirring was stopped at 20 min. The product was stored at room temperature under dry $N_2$ gas.

Example 10 (Preparation of PPG-TDI4)

The same reaction conditions as used in Example 7 were employed except that the amount of DBTDL used was 0.25 g. The product was stored at room temperature under dry $N_2$ gas.

Example 11

Polyol-1 (1 part in weight) was mixed well with PPG-TDI1 (1.8 part in weight) at room temperature for 3 min. The mixture was coated onto PET film at a coating rate of 6 mg/$cm^2$ (~0.05 mm thick). The coating was immediately laminated with a siliconized release paper at a pressure of 30 psi to give a PET film/reaction mixture/release paper laminate. The reaction mixture in the laminate was cured at room temperature for 20 h to give a PSA. The PSA was measured for its peel strength and shear adhesion in accordance with the following procedures, respectively.

Measurement of the peel strength was carried out on a stainless steel panel in accordance with ASTM D3330/D3330M-04 (Standard Test Method for Peel Adhesion of Pressure-Sensitive Tape). Briefly, tests were performed at 23±1° C. and 40±5% RH. The stainless steel panel was cleaned with ethanol and dried under a heat gun before each test. One end of a PSA specimen tape (24 mm by 150 mm) was applied onto the stainless steel panel and then pressed with a roller with a weight of 2040 g twice in the lengthwise direction. The other free end of the tape was attached to the grip on the load cell of a tensile tester. The distance from the grip to the surface of the stainless steel panel was about 25 mm. The tape was then peeled upwards at 90° angle at a speed of 5 mm/s; the force required to peel off the tape from the test panel was recorded as peel strength. Five specimens were tested for each PSA sample and the averaged value in N/cm was reported as the peel strength.

The shear adhesion was measured on a stainless steel panel (Type 302) in accordance with ASTM D3654/D3654M-06 (Standard Test Methods for Shear Adhesion of Pressure-Sensitive Tapes). Briefly, tests were performed at 23±1° C. and 40±5% RH. The stainless steel panel was cleaned with ethanol and dried with a heat gun before each test. A strip of PSA tape with 24 mm in width and 130 mm in length was applied onto the stainless steel panel with a contact area of 24 by 24 mm, the tape was then pressed with a roller with a weight of 2040 g twice in lengthwise direction. The panel was then fixed on a stand at an angle of 2° relative to the vertical direction. After 20 min of contact, the free end of the specimen was attached to a constant mass of 1000 g. The distance from the mass to the test panel was about 50 mm. A timing system was used to record the time when the tape separated from the panel. The time between the attachment of the constant mass and the complete separation of the tape from the test panel was used as the indication of shear adhesion. Three specimens were tested for each sample and averaged values in hour were reported as the shear adhesion of the PSA sample.

The test results on the peel strength and shear adhesion for the PSAs prepared in accordance with the Examples are summarized in Table 1.

The tests on the aging resistance for the PSAs were also performed in accordance with the following procedures. Briefly, a PSA specimen tape (24 mm by 150 mm) laminated with a release liner was placed in an Isotemp 625D Incubators (Thermo Fisher Scientific Inc., Waltham, Mass.) at 60° C. After one week, the tape was taken out and conditioned at 23±1° C. and 40±5% RH for 24 h prior the peel and shear tests. This procedure for the aging resistance test was referred to as "Aging test I" in this disclosure. Another procedure in accordance with ASTM D3611 (Standard Practice for Accelerated Aging of Pressure-Sensitive Tapes) was also performed for testing the aging resistance of the PSAs. Briefly, a PSA specimen tape (24 mm by 150 mm) laminated with a release liner was placed in a humidity oven at 66° C. and 80% relative humidity for 96 h. Then the specimen was taken out and conditioned at 23±1° C. and 40±5% RH for 24 h prior to the peel and shear tests. This procedure for aging resistance test was referred to as "Aging test II" in this disclosure.

The PSAs samples of the Examples after aging were subjected to the peel strength and shear adhesion tests according to the methods described above. Three specimens was tested and the averaged values was reported for both the peel and shear tests. The test results are summarized in Table 1.

Example 12

Polyol-1 (1 part) was mixed well with PPG-TDI1 (1.8 part) at room temperature for 3 min. The mixture was coated onto PET film at a coating rate of 2 mg/cm$^2$ (~0.025 mm thick). The coating on the PET film was heated in an oven at 140° C. for 5 s, and then laminated with a siliconized release paper at a pressure of 30 psi to give a PET film/adhesive/release paper laminate. The adhesive in the laminate was further cured at room temperature for 20 h to give a PSA. The PSA was measured for its peel strength and shear adhesion before and after aging. The test results are summarized in Table 1.

Example 13

The same formulation and procedure as used in Example 12 were used except that PPG-TDI1 was replaced with PPG-TDI2.

Example 14

Polyol-1 (4 parts) and Polyol-3 (1 part) were mixed well at 50° C. for 10 min and then cooled down to room temperature. PPG-TDI1 (9.7 parts) was added to the mixture, and the resulting mixture was mixed well at room temperature for 3 min. The same coating and curing process as used in Example 12 were applied except that the coating layer was heated in an oven at 125° C. for 60 s.

Example 15

The same formulation and procedure as used in Example 14 were used except that PPG-TDI1 was replaced with PPG-TDI4.

Example 16

The same formulation and procedure as used in Example 14 were used except that the curing temperature and time were 140° C. and 5 s, respectively.

Example 17

The same formulation and procedure as used in Example 14 were used except that Polyol-1 (1 part), Polyol-3 (4 parts) and PPG-TDI1 (12 parts) were used, and that the time for the curing in the oven at 125° C. was 90 s.

Example 18

Polyol-1 (9 parts) and Polyol-3 (1 part) were mixed well at 50° C. for 10 min and then cooled down to room temperature. PPG-TDI1 (18.7 parts) was added to the mixture, and the resulting mixture was mixed well at room temperature for 3 min. The same coating and curing process as used in Example 12 were applied except that immediately after coating, the coating layer on the PET film passed at a conveying rate of 0.6 cm/s through a home-made infrared tunnel that was equipped with an infrared lamp of 375 W and had a distance of about 12.5 cm from the lamb to the coating layer; the temperature right above the coating layer was about 140° C.

Example 19

The same formulation and procedure as used in Example 18 were used except that the formulation was coated onto a BOPP film and that the coating layer on the BOPP film was exposed to an infrared tunnel at 155° C.

Example 20

Polyol-2 (1 part) and PPG-TDI1 (2.2 parts) were mixed well at room temperature for 3 min. The same coating and curing process as used in Example 12 were applied except that the coating layer was heated in an oven at 125° C. for 60 s.

Example 21

Polyol-5 (1.1 part) and PPG-TDI1 (1 part) were mixed well at room temperature for 3 min. The mixture was applied onto PET film with a coater at coating rate of 6 mg/cm$^2$ (0.05 mm thick). The same curing process as used in Example 12 was applied except that the coating layer was heated in an oven at 100° C. for 30 min.

Example 22

Polyol (Methes, Kindly provided from Methes Energies International Ltd.; hydroxyl value, 140-260 mg KOH/g; molecular weight, 465) (1 part) and PPG-TDI1 (5.2 parts) were mixed well at room temperature for 3 min. The same coating and curing process as used in Example 21 were applied except that the coating layer was heated in the oven at 100° C. for 20 min.

Example 23

Polyol-6 (2 parts) was dissolved in ethyl acetate (1.5 part), the solution was then mixed well with tolylene 2,4-diisocyanate terminated poly(propylene glycol) (purchased from Sigma-Aldrich Corp., St. Louis, Mo.; with a number-average molecular weight of about 2340) (1.4 part) at room temperature for 3 min. The same coating and curing processes as used in Example 21 were applied except that the coating layer was heated in the oven at 100° C. for 45 min. Example 23 resulted in an adequate PSA. The PPG-TDIs of Examples 7-10 were prepared with technical grade TDI that is a mixture of 80% 2,4-TDI and 20% 2,6-TDI, so the PPG-TDIs are the mixture of 2,4-TDI-terminated PPG and 2,6-TDI terminated PPG. Commercially available 2,4-TDI terminated PPG is produced from pure 2,4-TDI.

Example 24

Castor oil (1 part) and PPG-TDI1 (3 parts) were mixed well at room temperature for 3 min. The same coating and curing process as used in Example 12 were applied except that the coating layer was heated in the oven at 125° C. for 30 s.

Example 25

Castor oil (1 part) and PPG-TDI1 (3 parts) were mixed well at room temperature for 3 min. The same coating and curing process as used in Example 12 were applied except that the PET film was replaced with paper backing. The coating layer on the paper passed at a conveying rate of 1.8 cm/s through a home-made infrared tunnel that was equipped with 4 infrared lamps (1800 W total) and had a distance of about 5.0 cm from the lambs to the coating layer; the temperature right above the coating layer was about 180° C.

Example 26

Castor oil (1 part), PPG-TDI1 (3 parts) and rosin ester (0.1 part, Sylvalite RE10L, from Arizona Chemical LLC., Jacksonville, Fla.) were mixed well at room temperature for 3 min. The same coating and curing process as used in Example 25 were applied.

Example 27

Castor oil (1 part) and PPG-TDI1 (3 parts) were mixed well at room temperature for 3 min. The same coating process as used in Example 12 was applied. The coating layer on the PET film passed at a conveying rate of 0.6 cm/s through a home-made infrared tunnel that was equipped with 2 infrared lamps (900 W total) and had a distance of about 5 cm from the lambs to the coating layer; the temperature right above the coating layer was about 160° C. The coating was then laminated with a siliconized PET at a pressure of 30 psi to give a PET film/adhesive/siliconized PET laminate. The adhesive in the laminate was further cured at room temperature for 20 h to give a PSA. Haze that could be determined by the following formula was used to evaluate transparency of a film, Haze (%)=$(T_d/T_t)\times 100$ (wherein $T_d$ is diffuse transmittance and $T_t$ is total light transmittance)

Haze for the above PSA/PET laminate was measured with a Color Quest Hunter Lab Spectrophotometer to be about 2.1%. A PSA/PET laminate with a Haze of less than 4% could be used as a surface protective film.

Example 28

Castor oil (1 part), PPG2000 (3 parts), DBTDL (0.03 part) and TDI (0.54 part) were mixed well at room temperature for 5 min. The same coating process as used in Example 12 was applied. The coating layer on the PET film passed at a conveying rate of 1.3 cm/s through a home-made infrared tunnel that was equipped with 2 infrared lamps (900 W total) and had a distance of about 5 cm from the lambs to the coating layer; the temperature right above the coating layer was about 160° C. The coating was then laminated with a siliconized PET film at a pressure of 30 psi to give a PET film/adhesive/siliconized PET film laminate. The adhesive in the laminate was further cured at room temperature for 20 h to give a PSA. The PSA/PET laminate had good wettability to glass, which was evidenced by the fact that only very a few air bubbles were observed after the laminate was quickly attached to a clean glass plate without applying pressure. The PSA on the PET film had a peel strength of 0.05 N/cm, which remained unchanged after being treated at 60° C. and 92% RH for 24 h. In addition, the PSA/PET film laminate was transparent, and no curling of the laminate was observed after the peel test. The above PSA/PET film laminate could be used as a surface protective film.

Example 29

Polyol-4 (1 part) and PPG-TDI1 (1.7 part) were mixed well at room temperature for 3 min. The same coating and curing process as used in Example 12 were applied except that the coating layer was heated in the oven at 125° C. for 30 s.

Example 30

The same formulation and procedure as used in Example 29 were applied except that the coating layer was heated in the oven at 125° C. for 60 s.

Example 31

Poly(ethylene glycol) with a number-averaged molecular weight of 1450 (9.65 g), TDI (2.32 g, technical grade, containing 80 wt % of tolylene-2,4-diisocyanate and 20 wt % of tolylene-2,6-diisocyanate) and dibutyltin dilaurate (0.09 g) were placed in a round bottom flask. After being flushed with $N_2$ gas for 5 min, the mixture was heated at 60° C. for 2 h. The reaction product (1 part in weight) was mixed well with castor oil (0.4 part in weight) at room temperature for 3 min. The mixture was then coated onto PET film at a coating rate of 2 mg/cm² (~0.025 mm thick). The coating layer was heated in an oven at 125° C. for 5 min, followed by laminating with a siliconized release paper at a pressure of 30 psi to give a PET film/adhesive/release paper laminate. The adhesive in the laminate was aged at room temperature for 20 h to give a PSA. The PSA had a peel strength of 0.1 N/cm. Thus, substitution of poly(ethylene glycol)s (PEGs) for PPGs for forming the polyurethanes only results in PSAs with a low peel strength of about 0.1 N/cm.

TABLE 1

Properties of PSAs from PPGs, TDI and plant oil-based polyols.

| | | | Aging test I | | Aging test II | |
|---|---|---|---|---|---|---|
| Examples of making PSAs | Peel strength (N/cm) | Shear adhesion (h) | Peel strength (N/cm) | Shear Adhesion (h) | Peel strength (N/cm) | Shear Adhesion (h) |
| 11 | 1.5 ± 0.1 | >168 | 0.9 ± 0.1 | >168 | 1.3 ± 0.2 | 76 |
| 12 | 1.9 ± 0.3 | >168 | 2.3 ± 0.1 | 131 | 1.9 ± 0.3 | >168 |
| 13 | 0.2 ± 0.1 | n.m.[a] | n.m. | n.m. | n.m. | n.m. |
| 14 | 1.0 ± 0.1 (2.7 ± 0.2[b]) (1.6 ± 0.1[c]) | >168 | 1.0 ± 0.1 | >168 | 1.0 ± 0.1 | >168 |
| 15 | 1.8 ± 0.2 | >168 | 2.2 ± 0.12 | >168 | 2.2 ± 0.1 | >168 |
| 16 | 1.4 ± 0.4 | >168 | 1.7 ± 0.2 | >168 | 1.5 ± 0.3 | >168 |
| 17 | 2.1 ± 0.1 | >168 | 1.5 ± 0.2 | >168 | 1.9 ± 0.2 | >168 |
| 18 | 2.0 ± 0.1 | >168 | n.m. | n.m. | 2.6 ± 0.3 | >168 |
| 19 | 2.1 ± 0.1 | >168 | 1.6 ± 0.1 | >168 | n.m. | n.m. |
| 20 | 2.6 ± 0.1 | 95 | 2.5 ± 0.1 | 80 | 3.3 ± 0.1 | 50 |
| 21 | 2.3 ± 0.2 | >168 | 2.3 ± 0.1 | >168 | Cohesive failure | n.m. |
| 22 | 2.0 ± 0.1 | >168 | 2.2 ± 0.1 | >168 | 2.4 ± 0.4 | >168 |
| 23 | 3.5 ± 0.1 | >168 | 3.4 ± 0.1 | >168 | 1.8 ± 0.1 | >168 |
| 24 | 1.5 ± 0.2 | >168 | 1.0 ± 0.1 | >168 | 1.5 ± 0.1 | >168 |
| 25 | 1.7 ± 0.4 (3.3 ± 0.3[b]) | >168 | n.m. | n.m. | 1.6 ± 0.3 | >168 |
| 26 | 2.5 ± 0.4 | >168 | n.m. | n.m. | 2.8 ± 0.2 | >168 |
| 27 | 0.3 ± 0.1 | n.m. | n.m. | n.m. | n.m. | n.m. |
| 28 | 0.05 ± 0.01 | n.m. | n.m. | n.m. | n.m. | n.m. |
| 29 | 4.8 ± 0.1 | 6 | 3.1 ± 0.2 | 3 | 4.0 ± 0.2 | 1 |
| 30 | 2.9 ± 0.1 | 100 | 3.5 ± 0.2 | 81 | 3.5 ± 0.2 | 13 |

[a] n.m., not measured;
[b] measured on PET test panel;
[c] measured on glass test panel.

In view of the many possible embodiments to which the principles of the disclosed compositions and methods may be applied, it should be recognized that the illustrated embodiments are only preferred examples of the invention and should not be taken as limiting the scope of the invention.

What is claimed is:

1. A polymer made by:
   (A) initially reacting poly(propylene glycol) with tolylene diisocyanate to form an intermediate product, and
   (B) subsequently reacting the resulting intermediate product with at least one polyol, wherein the polyol was derived from, or is, soybean oil.

2. The polymer of claim 1, wherein the poly(propylene glycol) has a number-average molecular weight of 300 to 4000.

3. The polymer of claim 1, wherein the poly(propylene glycol) is reacted with the tolylene diisocyanate at a temperature below 80° C.

4. The polymer of claim 1, wherein the polyol has a hydroxyl functionality of 2 to 6.

5. The polymer of claim 1, wherein a reaction mixture of the intermediate product and the at least one polyol is initially heated until conversion of NCO groups in the intermediate product reaches a degree ranging from 30% to 95%, and then subsequently cured at room temperature.

6. The polymer of claim 1, wherein the poly(propylene glycol), the tolylene diisocyanate, and the at least one polyol are the only reactive starting materials.

7. The polymer of claim 1, wherein the tolylene diisocyanate is tolylene-2,4-diisocyanate, tolylene-2,6-diisocyanate or a mixture of tolylene-2,4-diisocyanate and tolylene-2,6-diisocyanate.

8. A polymer made by reacting tolylene 2,4-diisocyanate terminated poly(propylene glycol) with at least one polyol, wherein the polyol was derived from, or is, soybean oil.

9. A polyurethane comprising a poly(propylene glycol) repeating unit, a tolylene diisocyanate repeating unit, and a polyol repeating unit, wherein the polyol was derived from soybean oil.

10. A polyurethane having a structure represented by:

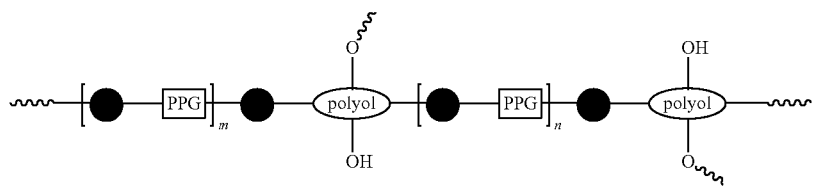

(● denotes a monomeric unit from tolylene diisocyanate (TDI)), wherein PPG denotes a monomeric unit from poly(propylene glycol); the polyol was derived from a plant oil; m is 1 to 100; and n is 1 to 100.

11. A pressure sensitive adhesive construct comprising:
(A) a backing substrate; and
(B) a pressure sensitive adhesive disposed on the backing substrate, wherein the pressure sensitive adhesive comprises a polymer made by:
(i) initially reacting poly(propylene glycol) with tolylene diisocyanate to form an intermediate product, and
(ii) subsequently reacting the resulting intermediate product with at least one polyol, wherein the polyol was derived from, or is, a plant oil.

12. A pressure sensitive adhesive construct comprising:
(A) a backing substrate; and
(B) a pressure sensitive adhesive disposed on the backing substrate, wherein the pressure sensitive adhesive comprises the polyurethane of claim 9.

13. A method for making a pressure sensitive adhesive comprising:
(A) initially reacting poly(propylene glycol) with tolylene diisocyanate to form an intermediate product, and
(B) subsequently reacting the resulting intermediate product with at least one polyol, wherein the polyol was derived from, or is, a plant oil.

14. A method for making a pressure sensitive adhesive comprising reacting tolylene 2,4-diisocyanate terminated poly(propylene glycol) with at least one polyol, wherein the polyol was derived from, or is, a plant oil.

15. The method of claim 13, wherein the polyol was derived from soybean oil.

16. The method of claim 13, wherein the polyol is castor oil.

17. The method of claim 13, wherein the poly(propylene glycol) has a number-average molecular weight of 300 to 4000.

18. The method of claim 13, wherein the poly(propylene glycol) is reacted with the tolylene diisocyanate at a temperature below 80° C.

19. The method of claim 13, wherein the polyol has a hydroxyl functionality of 2 to 6.

20. The method of claim 13, wherein a mixture of the intermediate product and the at least one polyol is initially heated until the conversion of NCO groups in the intermediate product reaches a degree ranging from 30% to 95%, and then subsequently cured at room temperature.

21. The method of claim 13, wherein the poly(propylene glycol), the tolylene diisocyanate, and the at least one polyol are the only reactive starting materials.

* * * * *